(12) United States Patent
Jalali

(10) Patent No.: US 7,796,576 B2
(45) Date of Patent: *Sep. 14, 2010

(54) MANAGING TRAFFIC IN COMMUNICATIONS SYSTEM HAVING DISSIMILAR CDMA CHANNELS

(75) Inventor: Ahmad Jalali, Rancho Santa Fe, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/556,854

(22) Filed: Sep. 10, 2009

(65) Prior Publication Data

US 2010/0002584 A1 Jan. 7, 2010

Related U.S. Application Data

(63) Continuation of application No. 10/940,039, filed on Sep. 13, 2004, now Pat. No. 7,590,099.

(60) Provisional application No. 60/506,290, filed on Sep. 25, 2003.

(51) Int. Cl.
*H04B 7/216* (2006.01)
*H04J 3/14* (2006.01)

(52) U.S. Cl. .......................... 370/342; 370/230

(58) Field of Classification Search ................ 455/450, 455/451; 370/230, 329, 342, 335
See application file for complete search history.

(56) References Cited

U.S. PATENT DOCUMENTS

| 5,914,950 | A | 6/1999 | Tiedemann, Jr. et al. |
|---|---|---|---|
| 6,148,210 | A | 11/2000 | Elwin et al. |
| 2001/0055275 | A1 * | 12/2001 | Herrmann et al. ........... 370/230 |

2003/0058798 A1 3/2003 Fleischer et al.

(Continued)

FOREIGN PATENT DOCUMENTS

EP 994604 A2 4/2000

(Continued)

OTHER PUBLICATIONS

Office Action mailed Jun. 11, 2008 for Australian Patent Application No. 2004306092, 3 pages.

(Continued)

*Primary Examiner*—George Eng
*Assistant Examiner*—Michael Faragalla
(74) *Attorney, Agent, or Firm*—Turocy & Watson, LLP

(57) ABSTRACT

In a code division multiple access (CDMA) communications system including one or more terminals (such as customer premise equipments, CPEs) that communicate with a node (such as an Internet gateway) via at least a random access channel and a reservation-oriented channel, various schemes of managing communications traffic among the channels are provided. Decisions as to the channel on which a given terminal may transmit may be based on: traffic statistics (such as packet size or average data rate over a time period), traffic content (such as packet type), the terminal's output buffer loading (queue state, or "Q-state"), a history of the terminal's output buffer loading (one or more Q-states), and so forth. In one application, decisions in managing traffic in a live user's web browsing sessions may involve intelligent ascertainment of whether a given terminal is busy based on traffic analysis or output buffer loading.

20 Claims, 6 Drawing Sheets

U.S. PATENT DOCUMENTS

2003/0078050 A1* 4/2003 Carlborg et al. ............ 455/452

FOREIGN PATENT DOCUMENTS

| | | |
|---|---|---|
| JP | 8181645 | 6/1996 |
| WO | 03055254 A2 | 7/2003 |
| WO | 03056470 | 7/2003 |

OTHER PUBLICATIONS

Office Action mailed Mar. 27, 2007 for Australian Patent Application No. 2004306092, 3 pages.
Office Action mailed Feb. 24, 2009 for Japanese Patent Application No. 2006-528118, 2 pages.
Office Action mailed Aug. 27, 2007 for Russian Patent Application No. 2006113928, 10 pages.
Office Action mailed Jul. 2, 2008 for Russian Patent Application No. 2006113928, 11 pages.
XP002251103, WO, Mar. 8, 1999, Ericsson.
Notice of Allowance mailed May 18, 2009 for U.S. Appl. No. 10/940,039, 21 pages.
Office Action mailed Feb. 24, 2009 for U.S. Appl. No. 10/940,039, 17 pages.
Office Action mailed May 2, 2008 for U.S. Appl. No. 10/940,039, 13 pages.
Office Action mailed Jul. 10, 2007 for U.S. Appl. No. 10/940,039, 13 pages.
Office Action mailed Aug. 25, 2009 for Mexican Patent Application No. PA/a/2006/003327, 5 pages.
Office Action mailed Feb. 26, 2009 for Australian Patent Application No. 2008261159, 3 pages.
Office Action mailed Feb. 4, 2009 for Canadian Patent Application No. 2539786, 3 pages.
Office Action mailed Sep. 30, 2009 for Canadian Patent Application No. 2539786, 4 pages.
Office Action mailed May 8, 2009 for Chinese Patent Application No. 200480034933.7, 8 pages.
Office Action mailed Feb. 21, 2007 for European Patent Application No. 04788888.8, 5 pages.
Office Action mailed Sep. 18, 2008 for European Patent Application No. 04788888.8, 11 pages.
Office Action mailed Feb. 29, 2008 for Indonesian Patent Application No. W-00200600836, 5 pages.
Office Action mailed Nov. 10, 2008 for Indian Patent Application No. 1600/DELNP/2006, 2 pages.
Office Action mailed Aug. 4, 2009 for Japanese Patent Application No. 2006-528118, 4 pages.
Office Action mailed Oct. 4, 2006 for New Zealand Patent Application No. 546101, 2 pages.
Office Action mailed Nov. 17, 2009 for Philippines Patent Application No. 1-2006-500618, 1 page.
Office Action mailed Feb. 8, 2008 for Ukraine Patent Application No. 200604510, 2 pages.
Office Action mailed Jul. 28, 2008 for Ukraine Patent Application No. 200604510, 2 pages.
Office Action mailed Mar. 5, 2009 for Vietnam Patent Application No. 1-2006-00670, 2 pages.
Written Opinion mailed Jan. 24, 2005 for PCT Patent Application No. PCT/US2004/030967, 5 pages.

* cited by examiner

MANAGING TRAFFIC IN COMMUNICATIONS SYSTEM HAVING DISSIMILAR CDMA CHANNELS

CROSS REFERENCE TO RELATED APPLICATIONS

This application is a continuation of U.S. patent application Ser. No. 10/940,039, filed on Sep. 13, 2004, entitled "MANAGING TRAFFIC IN COMMUNICATIONS SYSTEM HAVING DISSIMILAR CDMA CHANNELS", which claims priority to U.S. Provisional Patent Application Ser. No. 60/506,290, filed on Sep. 25, 2003, entitled "MANAGING TRAFFIC IN COMMUNICATIONS SYSTEM HAVING DISSIMILAR CDMA CHANNELS", the entireties of which are incorporated herein by reference.

BACKGROUND

1. Field of Invention

The invention relates to managing traffic in data communication systems in which dissimilar CDMA (code division multiple access) channels are present. More particularly, the invention relates to managing traffic in data communications systems in which a lower-capacity, "random access" (reservationless) asynchronous CDMA channel is present alongside a higher-capacity, "reservation-oriented" orthogonal CDMA channel.

2. Related Art

In Time Division Multiple Access (TDMA) based systems, available bandwidth is divided into time slots. The time slots are further divided into two general categories: Random Access Time Slots (RATS), and REservation Time Slots (RETS).

RATS are assigned as contention time slots where different customer premises equipments (CPEs) contend for resources. ALOHA-based contention resolution protocols are typically used on the RATS to resolve collision among customer premise equipments (CPEs). CPEs send a small packet on the RATS to request bandwidth on the RETS. Depending on the system, small packets may be transmitted on the RATS, but most traffic is sent over the RETS by first requesting for bandwidth.

TDMA systems suffer from two main disadvantages: longer access delay and lower bandwidth efficiency. Because a request needs to be sent on the RATS prior to acquiring reservation, a long delay is introduced. RATS time slots need to be operated at very low traffic loading to avoid excessive collisions and delay. This results in the lower bandwidth efficiency of TDMA systems.

Accordingly, there is a need in the art for a technique that provides shorter access delay and higher bandwidth efficiency. To this end, code division multiple access (CDMA) has been adopted. It has been generally recognized (Bhargava et al., Digital Communications by Satellite, John Wiley & Sons, New York, 1981, see esp. Chapter 9) that CDMA allows users to operate at a same nominal frequency while requiring minimal frequency or time coordination among users.

Different approaches to implementing CDMA have arisen. That is, CDMA channels that are dissimilar in some respects, such as asynchronous code division multiple access (ACDMA, see TIA/EIA/IS95 standard) and orthogonal code division multiple access (OCDMA), have allowed flexibility in designing communications systems. However, with the ability to incorporate multiple dissimilar channel types into a single communications system comes a requirement to effectively manage traffic on the dissimilar channels. For example, there is a need to optimize use of the dissimilar channels, in order to maximize overall system throughput while fairly allocating bandwidth among contentious terminals. However, the complexity of the dissimilar CDMA approaches has made optimum traffic management difficult.

Accordingly, there is a need in the art to provide an arrangement for effectively managing traffic on communications networks with different channels, especially dissimilar CDMA channels.

SUMMARY

In a code division multiple access (CDMA) communications system including one or more terminals (such as customer premise equipments, CPEs) that communicate with a node (such as an Internet gateway) via (for example) at least a random access channel (RACH) and a reservation-oriented channel (RESCH), various schemes of managing communications traffic among the channels are provided. Decisions as to the channel on which a given terminal may transmit may be based on a variety of criteria. The decisions may be binary decisions as to whether the terminal transmits on a RACH versus a RESCH; alternatively, more discerning decisions may involve upgrades to faster RESCH channels or downgrades to slower RESCH channels. Decisions in managing traffic, for example, in a live user's web browsing sessions may involve intelligent ascertainment of whether a given terminal is busy. The traffic management schemes provide medium access control (MAC) that is especially useful in, for example, a satellite communication network's return link that involves dissimilar CDMA channels (orthogonal code division multiple access (OCDMA) in the RESCH, and asynchronous code division multiple access (ACDMA) in the RACH).

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1:
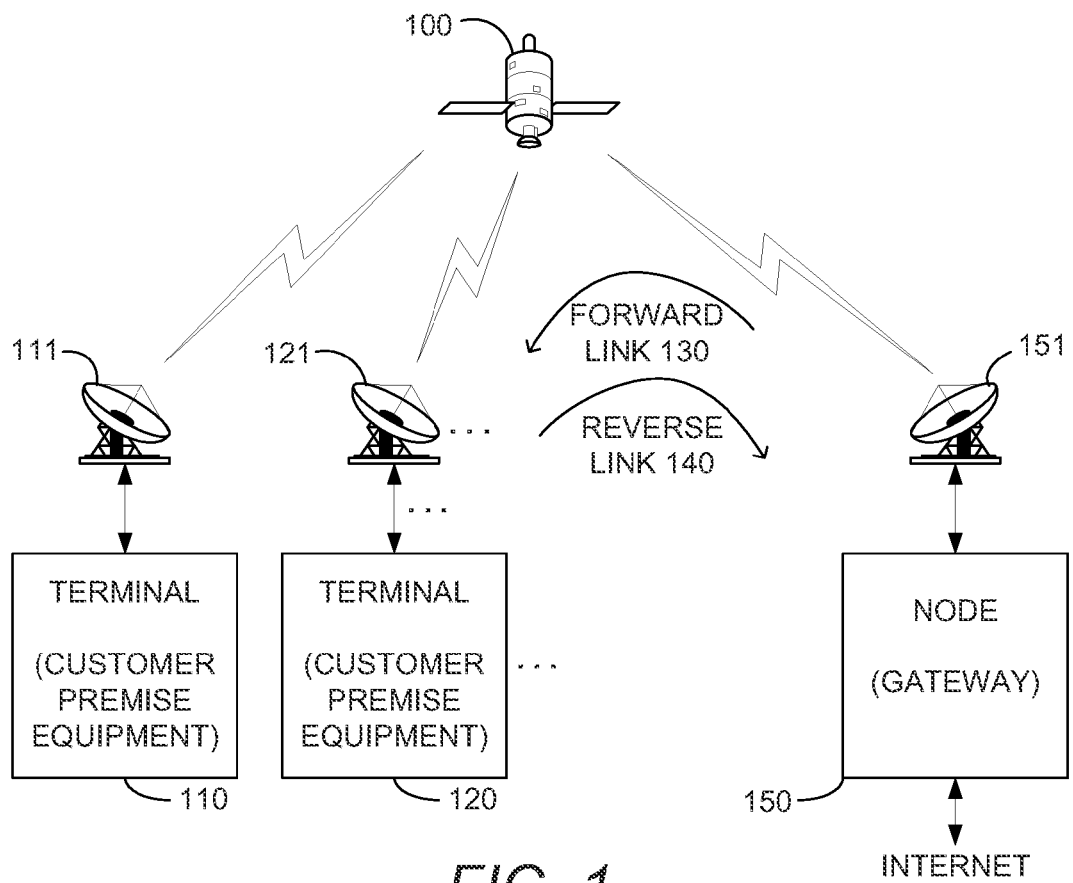
FIG. 1 schematically indicates a possible context of the traffic management method, in which return link (RL) of a communications network including a satellite communications network has traffic that must be managed.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Moreover, features and procedures whose implementations are well known to those skilled in the art are omitted for brevity. For example, initiation and termination of software loops, communication of parameters from one part of a network to another required to carry out its functions, and so forth, lie within the ability of those skilled in the art, and accordingly any detailed presentation thereof may be omitted.

Further, various aspects, features and embodiments of the data communication system may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process may correspond to a method, a function, a procedure, software, a subroutine, a subprogram, or any combination thereof.

Embodiments of traffic management arrangements may refer to customer premise equipments (CPEs), and to gateways between terrestrial and satellite communication networks. However, it is understood that the traffic management arrangements apply broadly to terminals, workstations, personal computers, and the like, in general; likewise, the traffic management arrangements broadly apply to routers, switches, proxy servers, nodes, and the like, in general. Moreover, functions such as control functions that are described as being implemented or executed at a particular location in a network, may also be performed at other suitable location(s) in the network.

Embodiments of communications systems may refer to "random access channels" (such as that specified in TIA/EIA/IS95), or reservation-oriented channels (such as that disclosed in U.S. patent application Ser. No. 10/428,953, filed on May 1, 2003, entitled "Orthogonal Code Division Multiple Access On Return Link Of Satellite Links"). These channels are merely exemplary channel types; the traffic management system may be applied to other channel types.

Various terms that are used in this specification are to be given their broadest reasonable interpretation when used in interpreting the claims.

Briefly, at least three types of channels may be provided. The channels are suitable for use in the return link (RL) of embodiments of the communications network described in this specification, networks that may include a satellite communications network. The three types of channels include:

The Random Access Channel (RACH) uses a reservation-less management method permitting random access to the communications medium, and employs ACDMA (asynchronous code division multiple access) techniques. The RACH thus provides access at "random" (unscheduled) times, but at the expense of overall data rate.

The REServation CHannel (RESCH) uses a reservation-oriented management method permitting access to the medium based on a limited number of codes (Walsh codes) that are assigned by (for example) a gateway to respective terminals so that the gateway may reliably distinguish among the terminals. The codes are mutually orthogonal, ensuring that communications from different terminals do not interfere with each other. The RESCH thus employs OCDMA (orthogonal code division multiple access) and is more efficient than the RACH in terms of overall data rate, though at the expense of the flexibility provided by RACH's random (unscheduled) access capability. In some embodiments, the RESCH may include a sub-channel called the "always-on" channel.

The Heartbeat Channel (HCH) relates to a feedback channel between the CPE and the gateway, and is thus of secondary concern to the management of traffic between the RACH and RESCH.

Traffic on the RACH and RESCH may be managed according to the principles described herein. Preliminarily, the basic characteristics of one non-limiting implementation of the channels are described.

The RACH. The RACH channel is based on Asynchronous Code Division Multiple Access (ACDMA), and user terminals may transmit on the RACH any time they have data to transmit without having to reserve bandwidth in advance. In conformance with CDMA principles, terminals spread their data using long pseudo-random (PN) codes. A number of PN codes are available to be used by the terminals, with each PN code specifying a respective random access channel. Different PN codes corresponding to the different RACH channels may be transmitted on the same carrier frequency. The RACH channel described herein and used in one embodiment has a structure described in the TIA/EIA/IS95 standard.

A terminal may randomly choose from a pool of PN codes and use a chosen PN code to spread its data. Alternatively, a node such as a gateway may assign a code for the terminal to use. In any event, each transmission on the RACH begins with a preamble to allow the gateway or other node to synchronize and detect the beginning of the terminal's transmission.

The RACH may be used primarily for initial registration at power up, for sending the packets at the beginning of a data flow when the terminal (customer premise equipment, CPE) has been inactive for a certain length of time and has not been assigned bandwidth on the RESCH, and for sending small bursts of short packets as discussed below. The bandwidth on the RESCH may be reserved for terminals based on the terminals' bandwidth requirements and the available RESCH bandwidth. The HCH is used by terminals to provide signal to interference-plus-noise ratio (SINR) feedback to the gateway and as a reference signal for RL signal strength measurements by the gateway.

The multiple access technique used on the RACH is asynchronous CDMA. Terminals (customer premise equipments, CPEs) spread their data using one of a number of pseudo noise (PN) codes. Each terminal is power controlled on the RACH such that its received SINR will be above a certain threshold, such as to achieve low (e.g., <10-4) packet error rate (PER). The capacity of the RACH, the number of PN codes needed in order to maintain the PER due to code collision below an acceptable level, the power control, and the overload control on the RACH are capable of being implemented by those skilled in the art and are not relevant to traffic management as such, and are thus not presented in any further detail herein. The procedures used to determine which packets are transmitted on the RACH and which packets are transmitted on the RESCH, are a topic of the following discussion.

The RESCH. The physical channel structure used to support the RESCH is orthogonal CDMA (OCDMA). One may think of TDMA approach using Walsh codes of length 1. The channel bandwidth in OCDMA is divided according to plural orthogonal Walsh codes of different lengths. Depending on a terminal's data rate requirement in the return link, in OCDMA the terminal is assigned an orthogonal Walsh code of a particular length. The bandwidth (defined by the assigned Walsh code) is allocated to a terminal for a specific time interval. Particular details of the physical layer channels, and of the mechanisms that may be used to achieve orthogonality among terminals' signals received at the gateway, are capable of being implemented by those skilled in the art and thus are not important to traffic management as such.

The HCH. The heartbeat channel (HCH) is a return link (RL) channel that is used by terminals to send feedback information to the gateway regarding the SINR achieved at the terminal. In one embodiment, the terminal transmits the index of the maximum data rate that the terminal may decode with low (e.g. <10-4) TCP packet error rate (PER). The gateway also uses the signal received from the terminal on the HCH to estimate received signal strength (RSS) from the terminal. The RL RSS is used to power-control fixed-rate channels on the RACH, as well as to determine the maximum data rate achievable on rate-controlled channels on the RESCH for a given transmit power level. Each terminal is allocated bandwidth on the HCH.

Following is a description of the medium access control (MAC) procedures that may be used to manage and direct signaling and user data on the RACH and RESCH. A variety of such MAC procedures are provided.

Generally, when the terminal has data to transmit but does not have any bandwidth allocation on the RESCH, the terminal starts a data flow by merely transmitting its packets on the RACH. Upon receiving the terminal's packets on the RACH, the gateway determines that the terminal has initiated a data flow, whereupon the gateway must decide whether or not to allocate bandwidth to the terminal on the RESCH.

Most of the following discussion focuses on bandwidth management schemes (and by implication, medium access control (MAC) schemes) for HTTP (hypertext transfer protocol) traffic. In HTTP traffic, the terminal web-browsing application connected to the return link carries the GETs and acknowledgements. There are a number of approaches to carrying the return link traffic generated by a HTTP flow.

Referring to FIG. 1, a context of the traffic management method, in which return link (RL) of a communications network including a satellite communications network has traffic that must be managed, is illustrated by way of non-limiting example. In FIG. 1, various "terminals" (customer premise equipments, CPEs) 110, 120, . . . are linked via respective satellite dishes 111, 121 . . . to satellite 100 and thus to a "node" (such as an Internet gateway) 150 via its satellite dish 151.

Forward link (FL) 130 denotes a direction of communication from the node to any of the terminals. Conversely, reverse link (RL, sometimes called return link) 140 denotes a direction of communication from any of the terminals to the node. The RL may be implemented using a combination of OCDMA and ACDMA techniques described above.

The CPEs (terminals) may vary in structure and operation, as may the gateway (nodes). Generally, the terminals and nodes have communication equipment operating according to mutually compatible communications protocols, such as TCP/IP and HTTP, allowing the terminals access to the Internet through the node. The node and terminals include respective processors configured to perform the analytical features described herein. The node, when implementing an Internet gateway, also includes a proxy server to allow the nodes access to the Internet.

It is readily appreciated by those skilled in the art that satellite and node bandwidth must be allocated among the terminals. Traffic management is particularly challenging, for example, when the traffic being managed is TCP/IP-HTTP traffic of live users' Internet web browsing sessions. Such traffic must traverse paths to and from satellites, paths that introduce significant time delays. The traffic control approaches described in this specification are particularly useful for use in the return link (RL) of systems such as that shown in FIG. 1 because of the RL's many-to-one multiplexing requirement; however, FIG. 1's RL is only one application of the approaches.

Generally, the disclosed approaches involve strategic management of which of the plural terminals 110, 120 . . . are granted more of the bandwidth available, in this example, to the satellite 100 and node 150, a goal being to maximize use of the available bandwidth. Examples of such approaches involve a link having medium access control (MAC) governing access to the RACH and RESCH channels described above.

Figure 2:
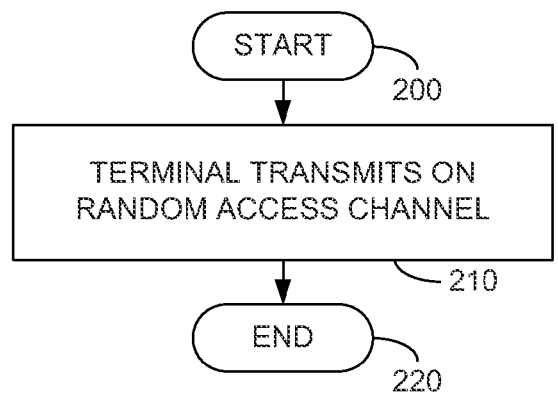
FIG. 2 shows a flow chart of a first embodiment of a traffic management method, in which a terminal transmits solely on a random access channel.

First embodiment (refer to FIG. 2). In a first embodiment, all traffic is carried on the RACH. An advantage of transmitting on the RACH is that the packets can be sent as soon as they are generated, and there is no additional reservation request delay.

Referring to FIG. 2, a flow chart illustrates steps of an exemplary implementation of the first embodiment. Block 200 represents the start of the process, followed by block 210 that indicates transmission of data on the random access channel. Block 220 represents the end of the process, when data transmission is completed.

Disadvantages of transmitting exclusively on the RACH include low bandwidth efficiency and low data rate.

Figure 3:
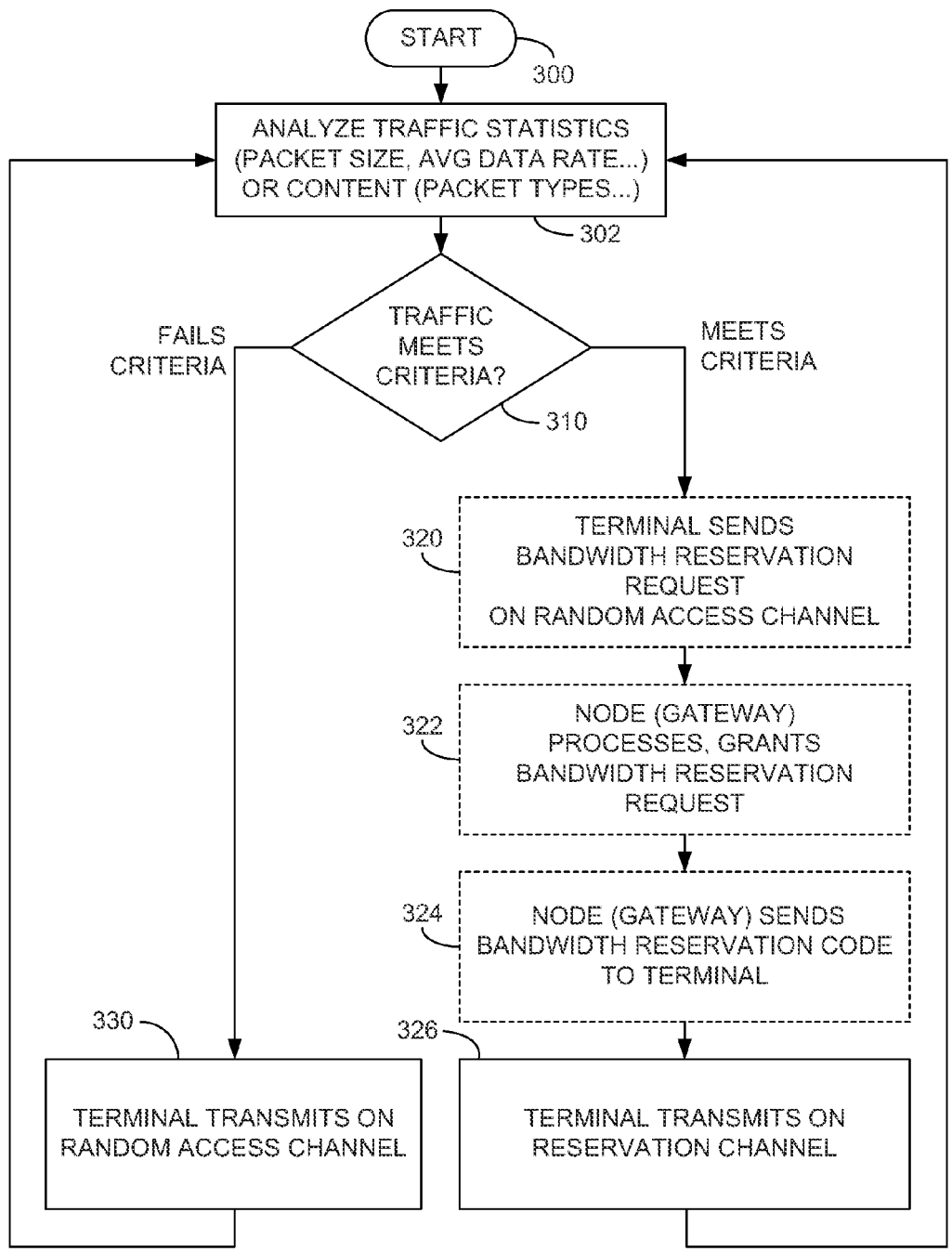
FIG. 3 shows a flow chart of a second embodiment of a traffic management method, in which a terminal may transmit data on a reservation-oriented channel after submitting and being granted a bandwidth reservation request, the bandwidth reservation request being granted if a traffic statistic (such packet size or average data rate over a time interval) exceeds a threshold, or if traffic content (such as packet types) satisfies certain criteria.

Second embodiment (refer to FIG. 3). A second approach for managing return link traffic is described with reference to HTTP traffic. Of course, it is recognized that embodiments need not be limited to HTTP traffic embodiments; other types of services may also be handled similarly.

In this second approach, the characteristics of traffic from a given terminal (CPE) are analyzed. The traffic characteristics that are analyzed, may include traffic statistics such as packet size or average data rate measured over a time period) or traffic content (such as packet type). Based on the analyzed traffic characteristics, traffic is thereafter transmitted on either the random access channel (RACH) or on a reservation-oriented channel (RESCH).

In one example, the terminal sends smaller packets (such as TCP acknowledgements) on the RACH. However, when a terminal desires to send a packet of length larger than a certain threshold size, the terminal requests bandwidth on the RESCH. To thus request bandwidth on the RESCH, the terminal sends a reservation request packet on the RACH.

Referring to FIG. 3, a flow chart illustrates steps of an exemplary implementation of the second embodiment, with block 300 indicating the start of the process.

Block 302 illustrates the analysis of data traffic relating to a given terminal. For example, traffic statistic(s) such as packet size or average data rate over a given time period are analyzed. Alternatively, the traffic content such as packet type or other criteria is analyzed. In one embodiment, the raw analysis takes place at the terminal but in other embodiments this analysis takes place in the node.

Block 310 illustrates a decision based on the analysis of traffic statistics or traffic content from block 302. If the analyzed traffic statistic falls below a threshold, or if traffic content fails a given criterion or criteria, then control passes to block 330 which indicates that the terminal transmits on the RACH. However, if the analyzed traffic meets or exceeds the threshold, or if traffic content satisfies the given criterion or criteria, then control passes to block 320.

Block 320 illustrates that the terminal sends a bandwidth reservation request, in one implementation, on the RACH. Subsequent block 322 indicates that the node (gateway) processes the terminal's request, and, on a bandwidth-available basis, grants the terminal's request. To communicate the granting of the request, the node sends a bandwidth reservation code to the terminal, as illustrated in block 324. Subsequently, block 326 illustrates that the terminal transmits on the RESCH.

Blocks 320, 322, 324 are portrayed in dotted lines to emphasize that the described implementation involves a request/granting process that transpires between the terminal (CPE) and node (gateway); however, this request-grant sequence is not the only one contemplated in order for the terminal to transmit on the RESCH. This second embodiment adds a round trip delay to each RL transmission, which increases the page response time for HTTP applications. However, the second embodiment has larger bandwidth efficiency than merely sending all data on the RACH as practiced in the first embodiment.

After both blocks 330 and 326, control passes back to analysis block 302. Thus, the analysis of traffic statistics or traffic content, and the subsequent determination of whether the terminal transmits on the RACH or on the RESCH, may be conducted continually.

Figure 4:
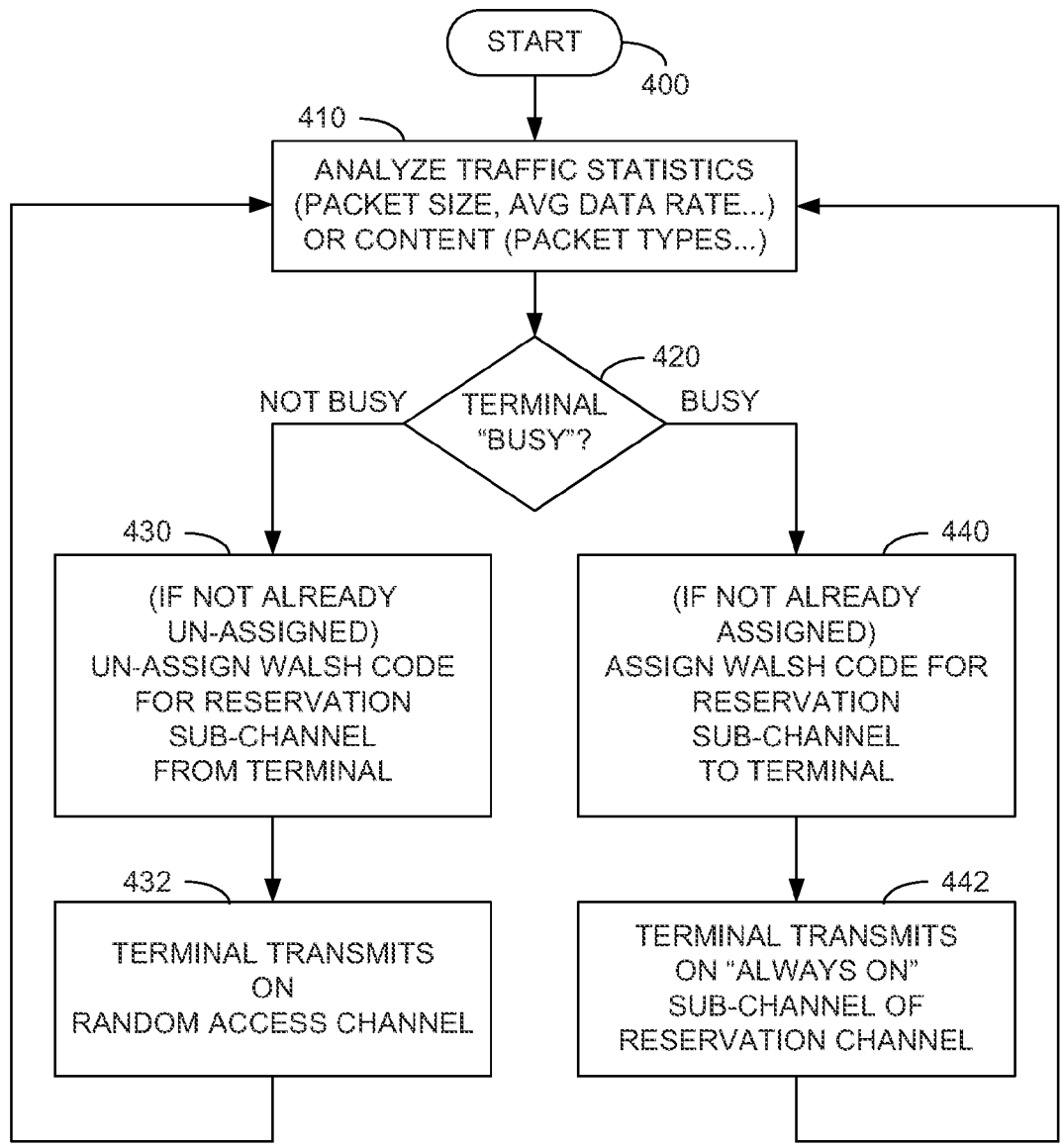
FIG. 4 shows a flow chart of a third embodiment of a traffic management method, in which a terminal's communication traffic statistics or content are monitored, and the terminal is allowed to transmit on an "always on" sub-channel of a reservation-oriented channel when the monitored traffic is deemed to indicate that the terminal is "busy" (actively being used by a user)

Third embodiment (refer to FIG. 4). A third approach is based in part on a recognition that traffic generated on the return link (RL) by, for example, HTTP data flow, is bursty and has low data rate requirement when compression is used. Therefore, the third approach to managing traffic involves assigning the data flow to a low data rate sub-channel on the reservation-oriented channel (RESCH), without the terminal having to go through an explicit reservation request process. In this description, this low data rate sub-channel is referred to as an "always on" channel, as it is "on" (assigned to a particular terminal) for at least the duration of the page request/response transaction time.

Advantageously, the "always on" channel approach avoids the reservation request delay, which is significant (about 0.5 second) in a geo-stationary satellite system. A disadvantage of the "always on" channel approach is that, because of the burstiness of the HTTP traffic, the channel will not always be utilized during the time it is assigned and "on." However, because only a fraction of the users that are assigned an "always on" channel actually transmit, the transmitting terminals are allowed to send at higher power and higher coding/modulation. This results in higher bandwidth efficiency when a terminal does transmit, a higher efficiency that partially compensates for terminals that do not fully utilize their assigned bandwidths, thereby achieving an overall (statistical) multiplexing gain. As mentioned above, it is not necessary to restrict this approach to HTTP traffic; the approach can be used with other types of services as well.

One approach for deciding whether or not to assign an "always on" channel to a flow is discussed as follows. This approach is described with reference to HTTP traffic as a non-limiting example: specifically, traffic involved when a human user is surfing the world wide web with a conventional web browser. It is understood, however, that the traffic may be other than HTTP.

Briefly, the gateway attempts to determine when a user is actually at a given terminal based on analysis of the traffic associated with that terminal. Presumably, the traffic is on the RACH and no Walsh code has been assigned that would grant the terminal permission to use the faster RESCH. If the gateway determines that a user is actively using the given terminal (that is, whether the terminal is "busy"), then the gateway assigns that CPE terminal a Walsh code that gives it permission to use a sub-channel of the RESCH. In one embodiment, the assigned sub-channel is an "always on" sub-channel whose data rate is slower than most other traffic on the RESCH.

The gateway continually monitors the traffic associated with the terminal, with the intention of maintaining the "always on" channel throughout the user's entire web session. When the quantity of the traffic in the active channel drops below a certain level of activity, then the gateway concludes that the individual is no longer actively using the terminal and revokes the terminal's permission to use the "always on" channel. Also, when the nature of the channel traffic indicates that only "background" HTTP traffic is being sent, the gateway concludes that the individual is no longer actively using the terminal and revokes the CPE's permission to use the "always on" channel.

In this manner, the gateway's continual monitoring and ensuing assignment and revocation of "always on" sub-channels in the RESCH increases the overall (statistical) usage of the bandwidth allocable to "always on" channels for plural terminals.

The decision to allocate an "always on" channel to a data flow may be initiated either by the terminal or by the gateway. If the terminal requests the "always on" channel, it may send the request on the RACH or "piggyback" the request on other RACH packets. Before the HTTP flow is designated worthy of the "always on" channel, its first few packets may be transmitted on the RACH in order to avoid the reservation delay. In any case, the gateway has the final say in granting the bandwidth.

The throughput (in bits/sec) of the "always on" channel may be defined as the amount of data the terminal transmits divided by the length of time the terminal has the bandwidth allocation. The effective bandwidth efficiency of the terminal on the "always on" channel is defined as its throughput divided by the amount of bandwidth allocated to the terminal, that is, bits per second per Hz actually carried.

Ideally, the gateway should allocate an "always on" channel to a terminal upon detecting a data flow from the terminal on the RL if it expects that the bandwidth efficiency on the "always on" channel will be larger than the bandwidth efficiency of the RACH. In one example, the throughput of the RESCH channel is nominally about 1.5 bits/sec/Hz (4.5 Mbps on a 3 MHz RL channel), whereas that of the RACH is about 0.3 bits/sec/Hz. Therefore, ideally one would like to transmit on the "always on" channel.

However, as discussed above, not all terminals who have an "always on" channel assignment actually utilize their respective assigned bandwidths. Therefore, one could transmit at higher power on the "always on" channel and use higher coding/modulation than is nominally used on the RESCH. The average and peak transmit power of all terminals transmitting on the "always on" channels need to be below acceptable levels allowed by the interference limit to the adjacent satellite.

Various approaches may be taken in determining if an "always on" channel should be assigned to a terminal, for example:
 a parametric flow detection approach based on the traffic characteristics of the data flow; or
 a context based flow detection mechanism.

The parametric based approach uses the traffic characteristics of the flow to predict whether or not the flow will generate enough traffic to achieve high enough effective bandwidth efficiency to warrant assignment of an "always on" channel. In this approach, the basic idea is to refrain from assigning "always on" channels to flows that are short in number of bytes and do not last long. This approach can assign an "always on" channel to a flow if the number of packets and/or the number of bytes received at the gateway from the terminal during a certain time interval exceed certain thresholds. The limit on the number of packets in a given measurement interval is intended to prevent assigning "always on" channels to flows that last for a short time and involve transactions such as DNS lookups.

A difficulty with not assigning an "always on" channel to a flow if the number of packets from the flow is below a certain threshold, is that even HTTP flow begins with a single GET. In that event, an "always on" channel would not be assigned to an HTTP flow until the response to the first GET arrives and generates a number of GETs. The subsequent GETs either would need to go on the RACH or would suffer a half second of reservation delay. To detect HTTP flows sooner, the approach may call a flow if number of bytes sent exceeds a threshold, or the number of packets sent exceeds a threshold.

A termination criterion is also provided, to rescind the "always on" channel when the flow ends.

The parametric based mechanism rescinds the "always on" channel when the flow has been inactive for more than a certain hangover time following the flow's last packet. The important parameter in this approach is how long the hangover time should be.

A long hangover approach (many minutes) is intended to ensure that the "always on" channel is available to a user throughout his web-browsing session. In other words, a long hangover time ensures that the "always on" channel is not taken away during "think times." The advantage of the long hangover is that as the user requests a new page there is no initial delay for requesting an "always on" channel. Of course, with long hangovers, bandwidth is wasted during think times and "always on" channels may get assigned to many CPEs whose computers are always running processes such as merely refreshing a site periodically.

In the short hangover model, the "always on" channel is taken away after a short time interval following the last packet of a flow. The short hangover model increases bandwidth efficiency, but increases the number of Walsh code reassignments. The short hangover time is chosen long enough to ensure that the "always on" channel is not taken away before the whole page response is received, but may be short enough that the always on channel is released during the think time.

The first few packets of a new flow (for example, a page request) are transmitted on the RACH in order to avoid the reservation delay. This approach adds traffic to the RACH, but using compression reduces the size of packets such as GETs considerably and the additional load on the RACH is small. Therefore, by sending the beginning of a flow on the RACH, reservation related delays are avoided.

Although the number of Walsh reassignments in the short hangover model is considerably larger than in the long hangover model, the required processing time and signaling to set up and tear down the "always on" channels should not be a bottleneck. The reason is that, in TDMA schemes, bandwidth allocation is carried out in a more dynamic manner than for the "always on" channels. Conceivably, each GET would need a separate reservation that would cause large delays as well as a large number of reservation request/grant transactions. Therefore, the number of "always on" channel assignments with short hangover time should be a lower bound to the number of channel reservations that a system with TDMA RL requires.

Another approach to deciding whether or not an "always on" channel should be assigned to a flow is context based (mentioned above).

In the non-limiting example using an HTTP proxy, the gateway detects that an HTTP application has begun and can therefore determine that an "always on" channel needs to be assigned. Even the data rate of the "always on" channel may be determined, based on other contextual information such as the web site that is being visited. Because the data rate of the "always on" channel may depend on how the page is cached by the client proxy, communication is provided between the client proxy and the gateway regarding an "expected" amount of RL traffic for the flow. Similarly, the gateway may, based on the content of the packets, detect that a page response has been completed and the "always on" channel may be rescinded.

The effective bandwidth efficiency of the context based "always on" channel assignment will be higher than the parametric based approach because the hangover time can be reduced almost to zero.

In context based flow detection, flow detection is really an extension of the proxy. In other words, web-browsing traffic generated by web browsers is detectable if the user is using the proxy. The assignment of the "always on" channel for these users is an extension of the proxy enhancements. Of course, the context based flow detection may be applied to types of traffic other than HTTP.

Referring to FIG. 4, a flow chart illustrates steps of an exemplary implementation of the third embodiment, in which block 400 illustrates the start of the process.

Block 410 illustrates a step of analyzing traffic statistics or traffic content that may be essentially the same as block 302 (FIG. 3). Accordingly, the detailed description thereof will not be repeated.

Block 420 illustrates a decision of whether or not the terminal is "busy." The definition of "busy" depends on the particular network implementation, especially the protocol being used. A terminal may be deemed to be "busy" if it is deemed that a human user is actively involved in interacting with the terminal in a way that causes communication over the communications link of a quantity or type exceeding that of mere "background" communication.

For example, if the terminal is communicating with Internet web sites using TCP/IP and HTTP (see FIG. 1), the determination of whether or not the terminal is busy may involve analysis of whether the terminal is actively sending requests to download web pages. If web page requests are actively being sent and web pages are in fact being downloaded in what appears to be an interactive web browsing session, then the terminal is deemed to be busy and control passes to block 440. However, if only minimal "background"

communication is being conducted, such as the minimum traffic needed to maintain a TCP session in the absence of user interaction over a predetermined period of time, then the terminal is deemed not to be busy and control passes to block 430.

Block 430 illustrates that, if a terminal is deemed not to be busy, any Walsh code for an "always on" sub-channel of a reservation-oriented sub-channel is un-assigned (revoked). If no Walsh code has already been assigned to the terminal, then block 430 does not carry out any operation. The Walsh code revocation is communicated to the terminal, which then transmits on the RACH as indicated in block 432.

Conversely, block 440 illustrates that, if a terminal is deemed to be busy, a Walsh code for an "always on" sub-channel of a reservation-oriented sub-channel is assigned. If a Walsh code has previously been assigned to the terminal, then block 440 does not carry out any operation, and the previous Walsh code assignment remains in force. Any new Walsh code assignment is communicated to the terminal, which then transmits on the RESCH as indicated in block 442.

After both blocks 432 and 442, control passes back to analysis block 410. Thus, the analysis of traffic statistics or traffic content, and the subsequent determination of whether or not the terminal is busy and whether it transmits on the RACH or on the RESCH, may be conducted continually.

Figure 5A:
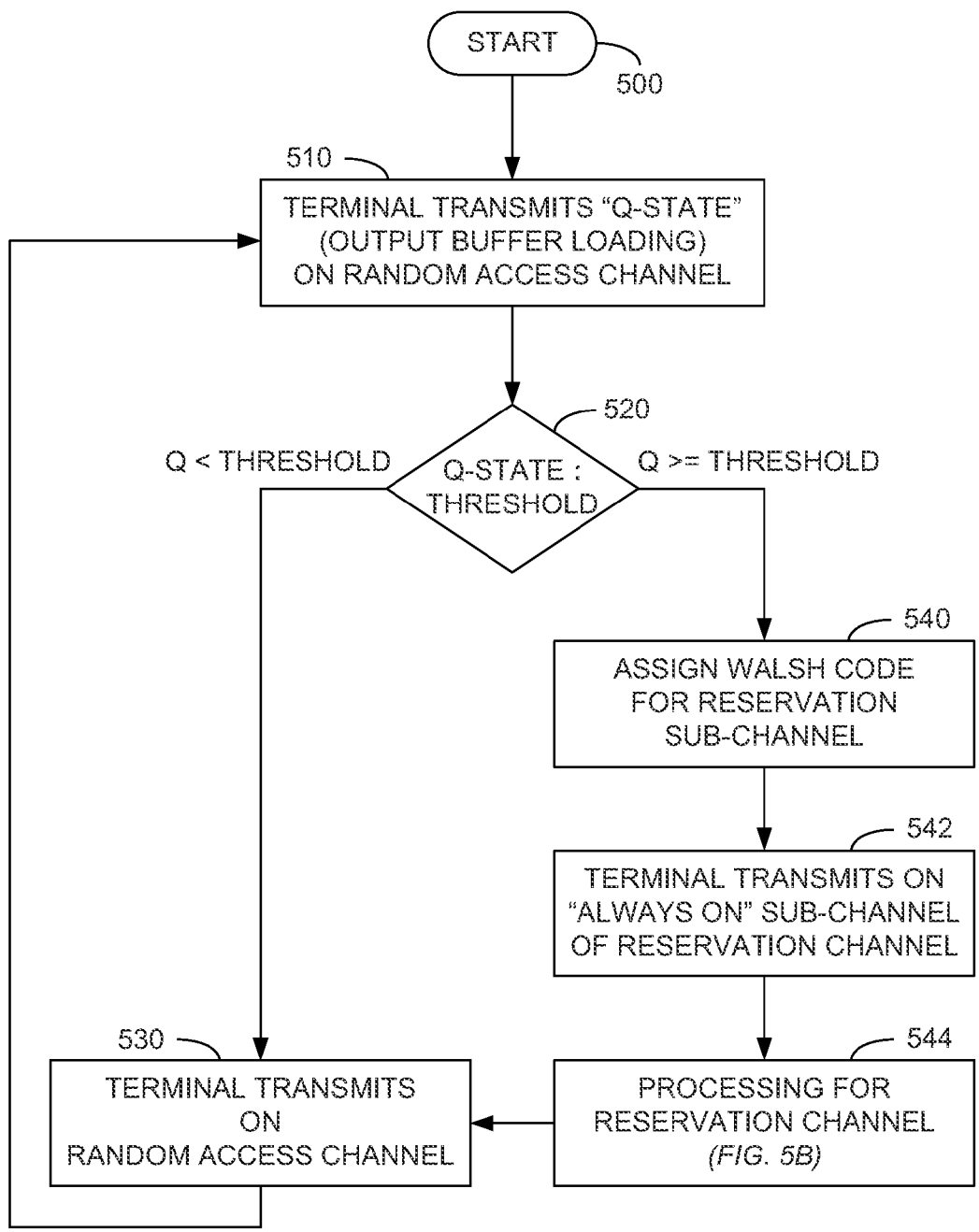
FIGS. 5A and 5B show flow charts of a fourth embodiment of a traffic management method, in which a terminal's "Q-state" (amount by which a terminal's output buffer is loaded) is monitored to determine whether its traffic should be carried by a random access channel or by a reservation-oriented channel; and if the traffic is to be carried by the reservation-oriented channel (FIG. 5B), whether a longer (or shorter, or same-length) Walsh code is assigned to the terminal so that the terminal thereafter transmits in a slower (or faster, or same-speed) channel.
Figure 5B:
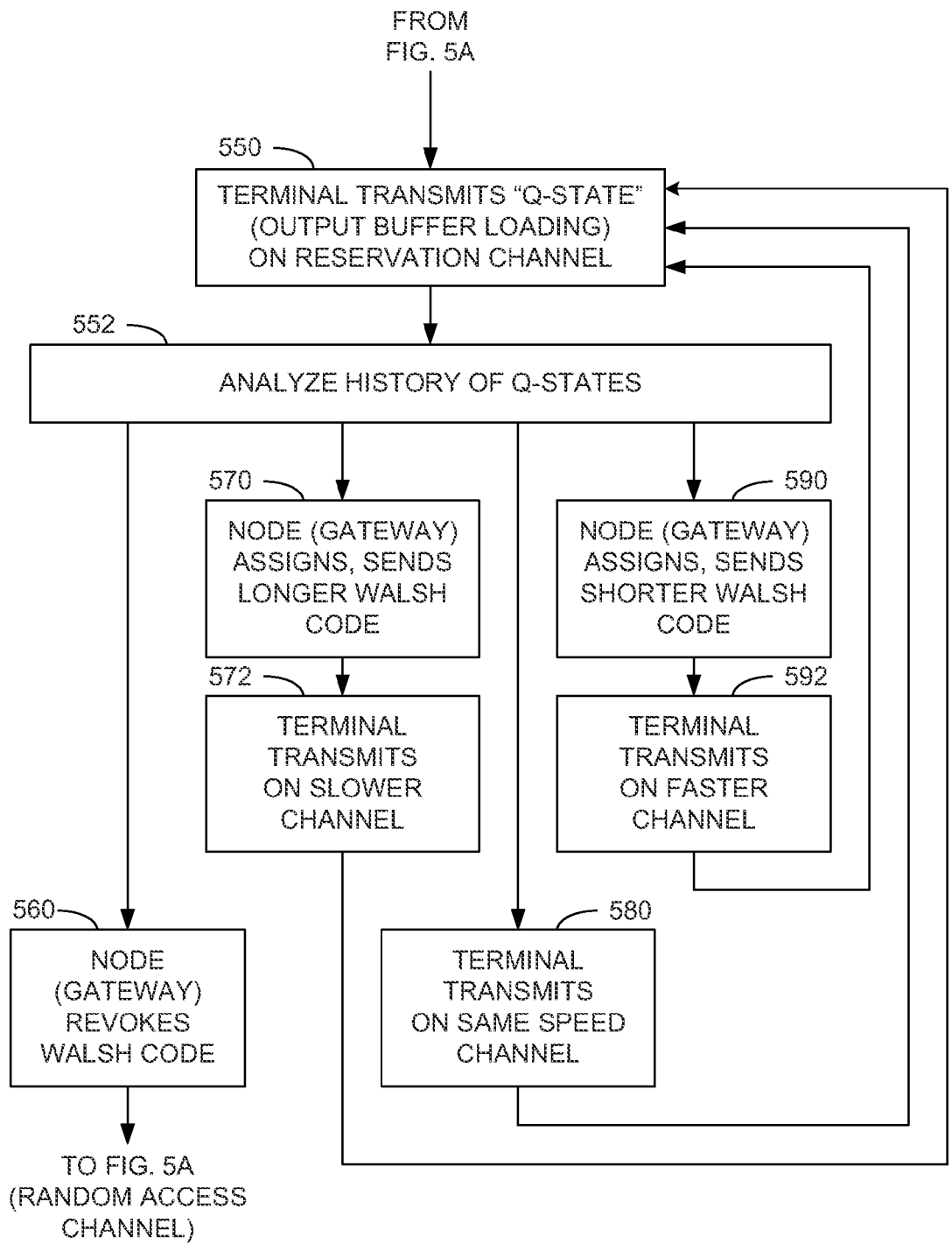

Fourth embodiment (refer to FIGS. 5A, 5B). In a fourth approach, the terminal initially transmits its packets on the RACH. Each packet contains the "Q-state" of the terminal. Here, "Q-state" indicates the amount of data that is in a terminal's output buffer (queue). The Q-state value may be, for example, the number of bytes that remain in the terminal's transmit queue at the time of transmission of the first bit of a Q state. The Q-state may be included in transmitted packets in a variety of ways. For example, the Q-state may be appended to the tail end of every MAC packet, the appending possibly being performed by the transmitting ASIC (application specific integrated circuit).

Based on the Q-state received from the terminal, the gateway may decide to assign a reservation channel to the terminal. In this case, the node (gateway) informs the terminal of its assigned Walsh code and the time duration of the reservation channel assigned to it.

Once a terminal is transmitting on the reservation channel, the terminal continues to transmit its Q-state. The node may decide, based on the value of Q-state sent by the terminal, to either upgrade the terminal's reservation channel Walsh code to a shorter Walsh code (higher rate channel), to extend the time duration of the current channel, or to assign a longer Walsh code (lower data rate channel).

Referring to FIGS. 5A, 5B, a flow chart illustrates steps of an exemplary implementation of the fourth embodiment, in which block 500 illustrates the start of the process.

Block 510 illustrates the terminals transmission of its output buffer loading (Q-state) on the RACH. Block 520 illustrates a decision of whether or not the Q-state meets or exceeds a given Q-state threshold. If the Q-state is less than the threshold, then control passes to block 530 which illustrates that the terminal transmits on the RACH.

However, if the Q-state meets or exceeds the threshold, then control passes to block 540 which illustrates the node's assignment to the terminal of a Walsh code for an "always on" sub-channel in a reservation-oriented channel. Block 542 illustrates the terminal's ensuing transmission on the "always on" sub-channel in the reservation-oriented channel. Block 544 generally indicates the processing that occurs when the terminal transmits in a reservation-oriented sub-channel. Block 544 is explained in greater detail below, with reference to FIG. 5B.

When the terminal no longer transmits on the RESCH (or on the "always on" sub-channel thereof), then control passes from block 544 to 530, illustrating that the terminal transmits on the RACH after it no longer transmits on the RESCH or a sub-channel thereof.

After block 530, control passes back to block 510. In this manner, the monitoring of the terminal's Q-state, and the subsequent determination of whether or not the terminal's output queue loading warrants assignment of a Walsh code permitting the terminal to transmit on the reservation channel, may be conducted continually.

Referring now to FIG. 5B, the details of the processing for the reservation channel (FIG. 5A block 544) are presented in further detail.

Block 550 illustrates the terminals transmission of its output buffer loading (Q-state) on the RESCH. Transmission of the Q-state on the RESCH contrasts with block 510's transmission of the Q-state on the RACH.

Block 552 illustrates the analysis of a history of the node's recent Q-states. Preferably, this analysis is conducted at the node (gateway) but using this location is not required. In any event, based on one or more recent Q-states, a decision is made concerning whether the terminal deserves to be assigned one of several possible channels:

no reservation-oriented transmission channel at all, but a random access channel instead (block 560 and return to FIG. 5A), a slower-speed reservation-oriented transmission channel (blocks 570, 572), a same-speed reservation-oriented transmission channel (block 580), or a higher-speed reservation-oriented channel (blocks 590, 592).

If the Q-state history indicates that the terminal's output buffer loading is being reduced to below a threshold or meets other criteria, it is concluded that the trend of the terminal is to substantially underutilize the RESCH, and accordingly the terminal's Walsh code is revoked in block 560. The node communicates the revocation of the Walsh code to the terminal, and control passes from block 560 back to block 530 (FIG. 5A), which indicates transmission on the RACH.

If the Q-state history indicates that the terminal's output buffer loading is being reduced to below another threshold or meets other criteria, it is concluded that the trend of the terminal is to slightly underutilize the present RESCH. Accordingly, the terminal's present Walsh code is replaced with a longer Walsh code in block 570. The node communicates the Walsh code modification to the terminal, and control passes to block 572 which indicates that the terminal transmits on a new RESCH that has a slower transmission speed than that of the previously assigned RESCH.

If the Q-state history indicates that the terminal's output buffer loading is approximately steady or meets other criteria, it is concluded that the terminal is correctly utilizing the present RESCH. Accordingly, the terminal's present Walsh code remains unchanged and in force. Control passes directly to block 580, which indicates that the terminal transmits on the same RESCH channel that it has been transmitting on (or at least a RESCH channel that has the same transmission speed).

Finally, if the Q-state history indicates that the terminal's output buffer loading is being increased to above a given threshold or meets other criteria, it is concluded that the trend of the terminal is to over-utilize the present RESCH. Accordingly, the terminal's present Walsh code is replaced with a shorter Walsh code in block 590. The node's communicates the Walsh code modification to the terminal, and control passes to block 592 which indicates that the terminal transmits on a new RESCH that has a faster transmission speed than that of the previously assigned RESCH.

In any event, after any of blocks 572, 580, 592, control passes back to block 550 for communication of subsequent Q-states. Thus, the analysis of the terminal's output buffer queue, and the subsequent determination of whether or not the terminal's Q-state history warrants a different-speed RESCH or even the RACH, may be conducted continually.

Using a history of more than one Q-state "averages out" any spurious Q-state values or short-lived anomalies in the terminal's output buffer loading. This approach reduces the number of times the terminal is needlessly switched between RACH and RESCH transmission (FIG. 5A versus FIG. 5B). Further, this approach allows sophisticated analytical techniques to be employed for deciding the amount of bandwidth a given terminal's Q-states warrant.

A particular implementation of this fourth embodiment is described as follows, with the understanding that:

"CPE" (customer premise equipment) supports the "terminal" presented throughout this specification, "Gateway" supports the "node" presented throughout this specification, "RACH" supports the random access (reservationless) channel, "RESCH" (reservation channel) supports the reservation-oriented channel, "RL" (return link; sometimes, reverse link) supports the part of the communications network on which the RACH, RESCH, and possibly other channels, may be found (see example in FIG. 1), and "FL" (forward link) is the link sending data in the opposite direction in the network as the RL (see example in FIG. 1).

A scheduler at the CPE determines whether the CPE packets destined to the Gateway go on the RACH or the RESCH. When the initial CPE transmission starts, it goes on the RACH. However, subsequently, when the CPE RL transmit queue builds up, the Gateway may need to allocate a reservation channel (short Walsh Code on an OCDMA channel) in order to speed up the download process of the current data transfer. The CPE periodically reports RL Q-state information to the Gateway by appending this information in every MAC packet transmitted to the Gateway. The Gateway determines, based on an RL queue depth threshold, if the currently reported RL Q-state exceeds this threshold that it needs to make a reservation for the CPE. This is based on the reasoning that it would take less time to empty the queue built-up workload with a higher rate of reservation than to persist with the existing rate to clear up the workload. The Gateway then has to determine what rate (short Walsh Code) to assign for reservation to the CPE and for how long. The rate is determined by the best rate from available pool of short Walsh Codes. The Gateway then determines whether the power required for transmitting at the rate can be supported by the CPE (i.e. it does not exceed the maximum Power Amplifier (PA) transmit power at the CPE). Otherwise, the best possible rate such that the transmit power required at the CPE does not exceed the maximum PA power is chosen, and the reservation (short Walsh Code allocation) is made to the CPE.

The Gateway continues to monitor the Q-state information from the CPE from the time it allocated a reservation to the CPE. If the subsequent Q-state updates are non-decreasing, then the current reservation can be extended beyond the end of the current reservation period. Since the current reservation has been allocated based on the original Q-state information, the CPE needs to be given extended period of reservation based on current higher Q-state information in order to clear up its queue size. A typical example of an application where extended reservations might be warranted is in case of ftp uploads. In this case, successive Q-state updates come with higher values of RL queue size, and the Gateway needs to keep extending the reservation period till the entire workload is cleared from the RL queue.

Also, if the Gateway finds that there are no short Walsh Codes available currently, then in case a CPE qualifies for getting a reservation (through its Q-state information), it handles the case as explained later in short Walsh Code overload scenario.

It is assumed that the Gateway centrally coordinates the allocation/deallocation of short Walsh Code. Details of this and the signaling required for allocation/deallocation of short Walsh Code is explained in subsequent sections.

State Variables Maintained at the CPE and the Gateway

Both the CPE and the Gateway maintain the state of the connection by a number of state variables. The Gateway maintains some of these state variables on a per CPE basis, i.e., to all the CPEs that are currently registered and part of the system. These state variables are:

CurrentState—denotes the current state of transmission on the RL, i.e. whether it is on RACH or RESCH. Based on that the CPE schedules the packet to be sent either on the RACH or RESCH.

QueueSize$_{CPE}$—denotes the current transmit queue size (in bits) at the CPE as reported by an arriving MAC packet from the CPE. QueueSizeCPE denotes the RL MAC queue size excluding the arriving MAC packet size.

QueueSize$_{GW}$—denotes the current transmit queue size (in bits) as maintained at the Gateway, just prior to the advent of a new MAC packet from the CPE.

QueueDepthThreshold—denotes the transmit queue size threshold (in bits) beyond which a CPE qualifies for a reservation.

CurrentRate—denotes the current rate at which that CPE is transmitting packets to the Gateway (in bits per second, bps) on the RL. The Gateway maintains this variable on a per CPE basis.

CurrentTime—denotes the current CDMA time at the Gateway.

RTT—Mean Round Trip time across the geostationary link (in seconds). Only one instance of this variable is maintained at the Gateway.

GuardTime—equals the largest difference in FL propagation delay that can be incurred by any two CPEs in a beam. The Gateway maintains only one instance of this variable.

ResvTime—equals the reservation time for the short Walsh Code reservation allocated to a CPE by the Gateway. The Gateway maintains an instance of this variable on a per CPE basis.

StartResvTime—denotes the start time of a short Walsh Code reservation channel at the Gateway. For a reservation that is determined at CurrentTime, the StartResvTime is set to CurrentTime+½ RTT+GuardTime at the Gateway (when the reservation starts at the CPE). The Gateway gives an allowance of GuardTime period over the mean FL propagation delay of ½ RTT in order to make sure all CPEs in a beam can hear the reservation message and start their reservation at the time StartResvTime.

EndResvTime—denotes the end of the short Walsh Code reservation time for a CPE. It equals StartResvTime+ResvTime.

CPE Transmit Procedure

The CPE appends the Q-state information on every data packet sent to the Gateway.

CPE Reception Procedure

The CPE receives signaling packets from the Gateway denoting a new short Walsh Code reservation or a termination of the current reservation.

If there is a new short Walsh Code reservation, then the CPE sets the CurrentState equal to RESCH at the beginning of StartResvTime and the reservation lasts till EndResvTime. Once the reservation ends, the CurrentState is set back to RACH to denote that future transmissions happen on the RACH instead of the RESCH.

If the CPE receives a signaling indication denoting the termination of a current reservation, then it sets the CurrentState to RACH from the termination time indicated in the signaling message.

Gateway Requirements

In this section, the Gateway procedures for determining at what threshold a CPE qualifies to get a short Walsh Code reservation, procedures for allocation/deallocation of short Walsh Code to a CPE, procedures for extending a current reservation session are discussed. The overall Gateway reservation algorithm is discussed.

Gateway Reception Procedure

The Gateway receives a MAC packet from the CPE and reads the Q-state field and updates the $QueueSize_{CPE}$ variable to the received Q-state. If the CPE does not have a reservation (i.e. its CurrentState is RACH), then the Gateway must first determine whether the CPE qualifies for a short Walsh Code reservation.

New Reservation Procedure at the Gateway

The RL queue depth threshold criterion for determining whether a flow with no current reservation qualifies for a reservation is given by the following equation.

$$QueueSize_{CPE} > QueueDepthThreshold = (RTT + GuardTime) * CurrentRate$$

(RL Queue Depth Threshold Determination)

A brief explanation of the above equation is as follows. A reservation is made only if the time taken to clear the workload in the RL transmit queue by giving a reservation is less than the time taken to clear the RL queue at the current rate of transmission, i.e.

$$(RTT/2 + RTT/2 + GuardTime) + \frac{\left(QueueSize_{CPE} - CurrentRate * (RTT + GuardTime)\right)^+}{NewRate}$$

$$< \frac{QueueSize_{CPE}}{CurrentRate}$$

$$(defining (z)^+ = \max(0, z))$$

$$\Rightarrow QueueSize_{CPE} \left( \frac{\frac{1}{CurrentRate} - }{\frac{1}{NewRate}} \right) > \left( \begin{array}{c} RTT + \\ GuardTime \end{array} \right) \left( 1 - \frac{CurrentRate}{NewRate} \right)$$

$$\Rightarrow QueueSize_{CPE} > (RTT + GuardTime) * CurrentRate$$

The LHS (left hand side) of the inequality has the term (RTT/2+RTT/2+GuardTime), which is the total round-trip delay after which a reservation gets started at the CPE–RTT/2 is the mean RL propagation delay after which the MAC packet resulting in a reservation reaches the Gateway, and the Gateway makes a reservation and RTT/2+GuardTime accounts for the FL propagation delay+guard time before which the reservation gets started at the CPE. The second term in the LHS is the total service time by the new higher rate (note that it accounts for RL queue drained out at old rate during the time period RTT+GuardTime). The RHS (right hand side) of the inequality is the total service time to service the RL queue at the current service rate.

The short Walsh Code pool at the Gateway is partitioned into various pools of W8, W16, W32, W64, W128 and W256 short Walsh Codes. From the list of available short Walsh Codes, the Gateway chooses a short Walsh Code with the maximum data rate such that certain constraints are met. First, the rate should be such that the total power radiated from all CPEs to the neighboring satellites is within the FCC (United States Federal Communications Commission) prescribed limits. Once a short Walsh Code is picked up based on above criteria, the Gateway determines whether the power required ($P_{required}$) for the transmitting rate can be supported by the CPE (i.e. $P_{required} < P_{max}$, where $P_{max}$ is the maximum allowable PA transmit power). If this rate is supportable, then the rate is set to $Rate_{WC}$. Otherwise, the Gateway determines what may be the next best rate supportable and it is set to $Rate_{WC}$. The reservation time ResvTime is computed as $$ResvTime = \frac{(QueueSize_{CPE} - CurrentRate * (RTT + GuardTime))}{Rate_{WC}}$$

(Reservation Time Determination for a Qualifying Flow)

The reservation begins from StartResvTime=CurrentTime+½ RTT+GuardTime, and lasts till EndResvTime=StartResvTime+ResvTime. The Gateway also updates the state variable QueueSizeGW to QueueSizeCPE.

The short Walsh Code reservation information (short Walsh Code, StartResvTime, EndResvTime) is conveyed from the Gateway to the CPE by a signaling message. The Gateway sends this message to the CPE on the FL Control Channel.

Algorithm for Allocating a New Reservation to a CPE

Gateway receives Q-state information ($QueueSize_{CPE}$) from the CPE.

It updates CurrentTime when the Q-state information is received.

```
if (CPE currently not receiving Reservation)
    // Check for Threshold Criteria for reservation
    if (QueueSize_CPE > (RTT+GuardTime)*CurrentRate)
        // Check whether any short Walsh Code available
        if(CurrentTime > EndResvTime for at least 1 short WC)
            1. Choose the short Walsh Code with maximum rate as
               allowed by the free Walsh Pool and other constraints and the
               CPE can support the required transmit power. Let its rate be
               given by Rate_wc
            2. Compute the reservation time, ResvTime
```

$$ResvTime = \frac{(QueueSize_{CPE} - CurrentRate * (RTT + GuardTime))}{Rate_{WC}}$$

```
            3. Allocate the short Walsh Code to the CPE for ResvTime,
               starting from StartResvTime = CurrentTime + ½ RTT + Guard
               Time, and up to EndResvTime = StartResvTime + ResvTime.
            4. Communicate the reservation to the CPE via signaling
               message.
        endif
    endif
endif
```

(Algorithm for Allocating Reservation to a New Flow)

Extending Reservations to Flows with Existing Reservation

The reservation period that is initially determined by the Gateway may not be sufficient in case the CPE provides subsequent Q-state reports with increasing $QueueSize_{CPE}$ (i.e. the CPE transmit queue is growing). In such a case, the Gateway determines whether the CPE qualifies to get an extension to a current reservation, and if so, how much should the reservation be extended.

The Gateway first determines whether the current system time, CurrentTime is greater than EndResvTime. If so, this implies that the CPE cannot get an extension of its current reservation (since its current reservation has expired at EndResvTime), but has to go through the new reservation process. It further checks whether there is sufficient time for a registration extension message to reach the CPE before its current reservation expires at EndResvTime, i.e. CurrentTime<EndResvTime−(½ RTT+GuardTime)−(Transmission+Reception+Processing Delay). If not, the Gateway cannot extend the reservation to the CPE. If the current reservation is not expired, then the Gateway determines the incremental increase/decrease in $QueueSize_{CPE}$ since the last Q-state report. That is, the Gateway determines deltaQueue=(QueueSize$_{CPE}$−QueueSize$_{GW}$+CurrentReceivedPacketSize). If there is an increase, then it computes the increment in reservation as deltaQueue/Rate$_{WC}$. The Gateway updates the EndResvTime=EndResvTime+deltaQueue/Rate$_{WC}$ and also updates the QueueSize$_{GW}$ to QueueSize$_{CPE}$. The Gateway then sends the incremental reservation information (short Walsh Code, EndResvTime) to the CPE by a signaling message. The Gateway sends this message to the CPE on the FL Control Channel.

Algorithm for Extending Existing Reservation to a CPE

Gateway receives Q-state information (QueueSize$_{CPE}$) from CPE

```
if (reservation can be extended as per above criteria)
    deltaQueue = QueueSize_CPE − QueueSize_GW +
    Current ReceivedPacketSize
    if (deltaQueue > 0)
        IncrementResv = deltaQueue/Rate_WC
        Communicate IncrementResv to CPE via signaling message
        Update EndResvTime = EndResvTime + IncrementResv
        Update QueueSize_GW = QueueSize_CPE
    endif
endif
```

(Algorithm for Extending Reservation to Flows with Reservation)

Change Reservation Rate (Current Reservation Rate Unsustainable at CPE)

During the reservation period of the CPE, the Gateway continually monitors whether the power at the CPE required to transmit at current rate ($P_{desired}$) is within the maximum PA transmit power ($P_{max}$). If the criterion is met, then the CPE is allowed to continue transmission at the current rate. If the criterion is not met (due to changing channel conditions like rain fade), the Gateway re-computes the maximum rate that can be allowed based on its rate tables.

The Gateway rescinds the current reservation to the CPE and communicates the new reservation to the CPE via a new reservation message with the new rate on the FL Control Channel.

Reassign Short Walsh Code to New Reservation, Overload Procedure at Gateway

Suppose a CPE flow qualifies for reservation. The Gateway checks whether CurrentTime>EndResvTime for any short Walsh Code currently taken up. A more aggressive approach could be to check whether CurrentTime>EndResvTime−½ RTT+GuardTime for any short Walsh Code currently taken up. This means that a reservation decision could be made by the Gateway for reusing the short Walsh Code before an existing reservation using the same short Walsh Code at a CPE expires. This is more efficient since the new reservation only starts from CurrentTime+½RTT+GuardTime, which is guaranteed to be>EndResvTime+2*GuardTime and the previous reservation ends in EndResvTime and thus, there is no clash in reservation allocation. This also improves the reservation allocation efficiency since the short Walsh Code is not being utilized for 2*GuardTime interval, which is a much smaller overhead compared to ½ RTT+GuardTime time period (GuardTime<<½RTT) wastage between reassignments by the earlier conservative approach.

Between the two design choices above, the more efficient approach is adopted, i.e. the check for CurrentTime>EndResvTime−½RTT+GuardTime is done by the Gateway. If so, then there is a reservation available, and the Gateway allocates a reservation. Otherwise, if there is no available reservation (Short Walsh Code overload condition), then the Gateway denies the reservation to the CPE (i.e. does not act on the Q-state information and provide reservation).

Signaling Requirements for Reservation Allocation/Deallocation at Gateway

The Gateway controls and coordinates the allocation and deallocation of the short Walsh Code reservation to the CPEs. It is assumed by the reservation algorithm that the short Walsh Code gets deallocated at the expiry of the current reservation period (EndResvTime) and the CPE does not signal the Gateway that it has relinquished the short Walsh Code reservation. Note that the EndResvTime may not be the original reservation period that is allocated to the CPE, but the updated EndResvTime after multiple extensions of reservation. For every new reservation allocation and possibly subsequent extensions of the reservation periods to a CPE, the Gateway explicitly notifies the CPE through a signaling message that is sent on the FL Control Channel.

CPE Algorithm

CPE sends Q-state information (QueueSize$_{CPE}$) on data packets destined to the Gateway.

Gateway Algorithm

Gateway receives Q-state information (QueueSize$_{CPE}$) from the CPE.

It updates CurrentTime when the Q-state information is received.

```
if(CPE currently not receiving Reservation)
        // Check for Threshold Criteria for reservation
        if(QueueSize_CPE > (RTT+GuardTime)*CurrentRate)
                // Check whether any short Walsh Code available
                if(CurrentTime > EndResvTime − ½ RTT + GuardTime for at least 1
    short WC)
                        1. Choose the short Walsh Code with maximum rate as
                        allowed by the free Walsh Pool and other constraints and the
                        CPE can support the required transmit power. Let its rate be
                        given by Rate_wc
                        2. Compute the reservation time, ResvTime
```

$$ResvTime = \frac{(QueueSize_{CPE} - CurrentRate*(RTT + GuardTime))}{Rate_{WC}}$$

```
                        3. Allocate the short Walsh Code to the CPE for ResvTime,
                        starting from StartResvTime = CurrentTime + ½ RTT+ Guard
                        Time, and up to EndResvTime = StartResvTime + ResvTime.
                        4. Communicate the reservation to the CPE via signaling
                        message.
                else
                        No short Walsh Code available currently, Gateway denies
                        reservation to the CPE.
                endif
        endif
else // CPE currently receiving Reservation
        // Check whether the CPE needs and extension in Reservation
        deltaQueue = QueueSize_CPE − QueueSize_GW + Current ReceivedPacketSize
        if(deltaQueue > 0 and reservation can be extended)
        IncrementResv = deltaQueue/Rate_WC
        Communicate IncrementResv to CPE via signaling message
        Update EndResvTime = EndResvTime + IncrementResv
        endif
        Update QueueSize_CW = QueueSize_CPE
        // The Gateway determines that the current reservation rate cannot be
    sustained due to transmission power required at the CPE exceeding maximum PA
    transmit power. Instead a lower rate that can be sustained is notified
        if(new reservation required)
                1. Recompute new ResvTime based on the new short Walsh Code
                assignment.
                2. Allocate the short Walsh Code to the CPE for ResvTime, starting
                from StartResvTime = CurrentTime + ½ RTT+ GuardTime, and
                up to EndResvTime = StartResvTime + ResvTime.
                3. Communicate the new reservation to the CPE, and simultaneously
                rescind old reservation to the CPE via signaling message.
        endif
endif
```

Figure 6:
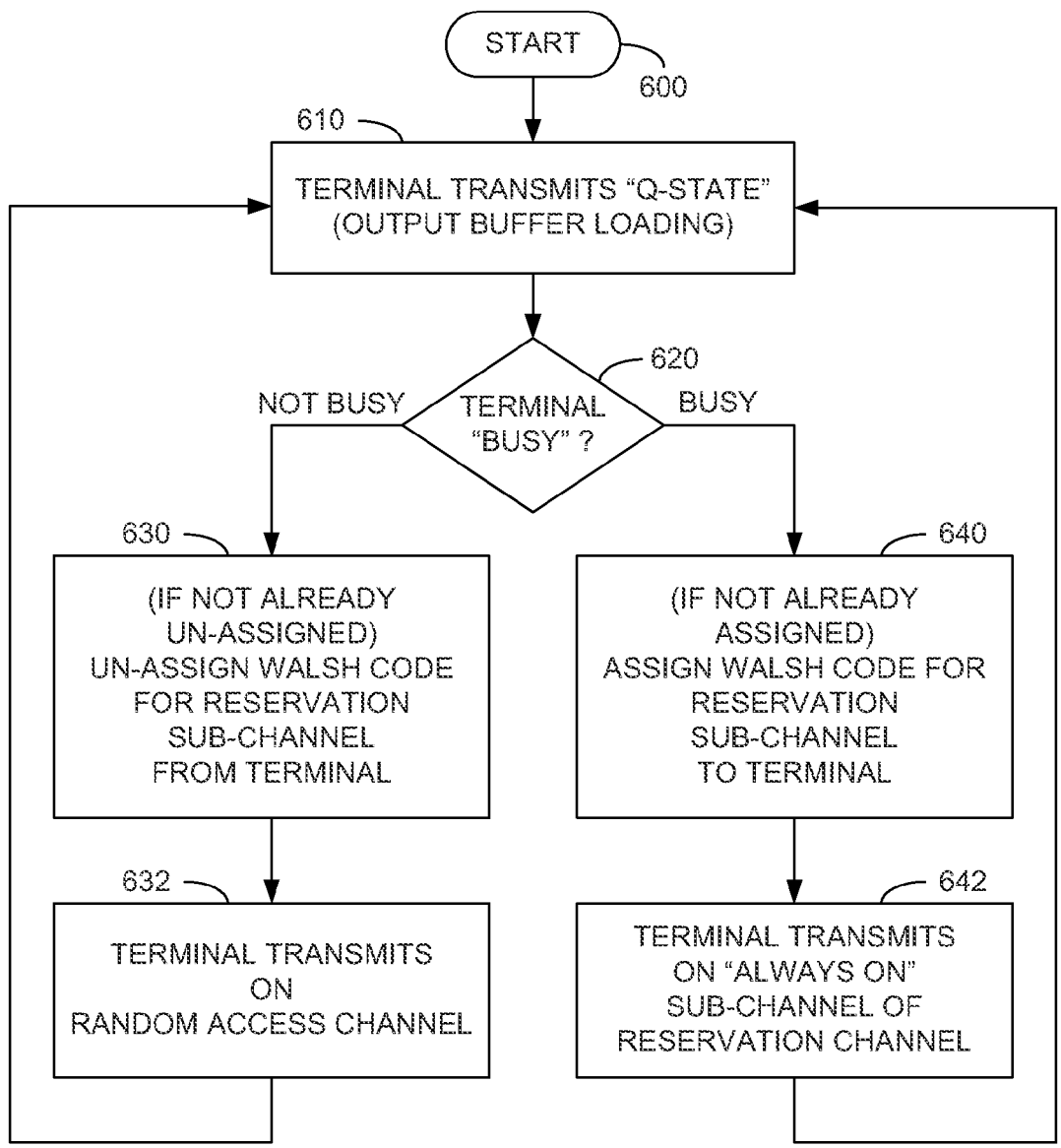
FIG. 6 shows a flow chart of a fifth embodiment of a traffic management method, in which the history of a terminal's "Q-state" (amount by which a terminal's output buffer is loaded) is monitored to determine whether to grant or revoke the terminal's permission to transmit on an "always-on" sub-channel of a reservation-oriented channel.

Fifth embodiment (refer to FIG. 6). Some of the teachings of the fourth embodiment may also be used in conjunction with the "always on" sub-channel of the channel described with reference to the third embodiment. The gateway may decide whether a terminal is "busy" based on the terminal's Q-state, and to upgrade the terminal to use an "always on" sub-channel of the reservation-oriented channel as long as it is busy.

Referring to FIG. 6, a flow chart illustrates steps of an exemplary implementation of the fifth embodiment, in which block 600 illustrates the start of the process.

Block 610 illustrates the terminal's transmission to the node (gateway) of the terminal's Q-state (output buffer loading). This transmission is either on the RACH (assuming the terminal presently does not have permission to transmit on a RESCH) or on a RESCH (assuming the terminal presently has permission to transmit on a RESCH).

Block 620 illustrates a decision of whether or not the terminal is "busy." The definition of "busy" depends on the particular network implementation, especially the protocol being used. A terminal may be deemed to be "busy" if it is deemed that a human user is actively involved in interacting with the terminal in a way that causes communication over the communications link of a quantity or type exceeding that of mere "background" communication. Block 620 is essentially the same as block 420 (FIG. 4) and its detailed discussion will not be repeated.

Block 630 illustrates that, if a terminal is deemed not to be busy, any Walsh code for an "always on" sub-channel of a reservation-oriented sub-channel is un-assigned (revoked). If no Walsh code has been previously assigned to the terminal, then block 630 does not carry out any operation. The Walsh code revocation is communicated to the terminal, which then transmits on the RACH as indicated in block 632.

Conversely, block 640 illustrates that, if a terminal is deemed to be busy, a Walsh code for an "always on" sub-channel of a reservation-oriented sub-channel is assigned to the terminal. If a Walsh code has previously been assigned to the terminal, then block 640 does not carry out any operation, and the previous Walsh code assignment remains in force. Any new Walsh code assignment is communicated to the terminal, which then transmits on the RESCH as indicated in block 642.

After both blocks 632 and 642, control passes back to analysis block 610. Thus, the analysis of terminal's output buffer loading, and the subsequent determination of whether or not the terminal is busy and whether it transmits on the RACH or on the RESCH, may be conducted continually.

Also provided, for the methods described herein, are computer program products (such as storage media) storing program instructions for execution on a computer system having at least one data processing device, whose instructions when executed by the computer system cause the computer system to perform the methods described herein.

Further provided are systems for performing the methods described herein, the systems including at least one of a terminal (or customer premise equipment) and a node (such as a gateway). The terminals and nodes (or gateways), and the like, may readily be implemented by those skilled in the art. Generally, these elements may be implemented as any appropriate computers employing technology known by those skilled in the art to be appropriate to the functions performed. A terminal or node may be implemented using a conventional general purpose computer programmed according to the foregoing teachings, as will be apparent to those skilled in the computer art. Appropriate software can readily be prepared by programmers of ordinary skill based on the teachings of the present disclosure, as will be apparent to those skilled in the software art. Other suitable programming languages operating with other available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system includes at least one computer readable medium. Examples of computer readable media include compact discs, hard disks, floppy disks, tape, magneto optical disks, PROMs (for example, EPROM, EEPROM, Flash EPROM), DRAM, SRAM, SDRAM).

Stored on any one or on a combination of computer readable media is software for controlling both the hardware of the computer and for enabling the computer to interact with a human user, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

For example, based on FIG. 3, in a code division multiple access (CDMA) communications system including plural terminals that communicate with a node via at least a random access channel and a reservation-oriented channel, a method of managing traffic on the random access and reservation-oriented channels is provided. The method involves comparing to at least one criterion, characteristics of traffic in which data is communicated from a given terminal. If the traffic characteristics satisfy the at least one criterion, the method involves sending a bandwidth reservation request; processing and granting the bandwidth reservation request; communicating the granting of the bandwidth reservation request to the given terminal; and causing the given terminal to transmit data on the reservation-oriented channel. If the traffic characteristics fail the at least one criterion, the method involves causing the given terminal to transmit data on the random access channel.

The random access channel may be configured to permit the terminals to communicate data on the random access channel at times that are not previously scheduled, and the reservation-oriented channel may communicate data at a higher overall data rate than the random access channel.

The terminals may be customer premise equipments (CPEs), and the node may be a gateway linking plural CPEs to an internet via a satellite communications network.

The given terminal may send the bandwidth reservation request, the node may process and grant the bandwidth reservation request, and the granting of the bandwidth reservation request is communicated from the node to the given terminal.

The random access channel may transmit data based on asynchronous code division multiple access (ACDMA), and the reservation-oriented channel may transmit data based on orthogonal code division multiple access (OCDMA).

The at least one criterion may include a threshold packet size, and the comparing step may involve comparing the threshold packet size to a packet size that characterizes packets in which data is to be communicated from the given terminal.

The at least one criterion may include a threshold data rate, and the comparing step may involve comparing the threshold data rate to an average data rate calculated over a time interval, that characterizes packets in which data is to be communicated from the given terminal The at least one criterion may include a packet type indication, and the comparing step may involve comparing the packet type indication to packet types that characterize packets in which data is to be communicated from the given terminal.

As another example, based on FIG. 4, in a code division multiple access (CDMA) communications system including plural terminals that communicate with a node via at least a random access channel and a reservation-oriented channel, a method of managing traffic on the random access and reservation-oriented channels is provided. The method involves a) comparing to at least one criterion, characteristics of traffic in which data is communicated from a given terminal, so as to arrive at an examination result, and b) determining, based on the examination result, whether the given terminal is in a busy condition. If the given terminal is determined to be in a busy condition, the method involves assigning to the given terminal, a code designating a reservation-oriented sub-channel; and causing the given terminal to transmit data on the reservation-oriented sub-channel. But if the given terminal is determined not to be in a busy condition, the method involves causing the given terminal to transmit data on the random access channel.

The code assigning step may involve assigning a Walsh code to the given terminal.

The random access channel may be configured to permit the terminals to communicate data on the random access channel at times that are not previously scheduled, and the reservation-oriented channel may communicate data at a higher overall data rate than the random access channel.

The terminals may be customer premise equipments (CPEs), and the node may be a gateway linking plural CPEs to an internet via a satellite communications network.

The random access channel may transmit data based on asynchronous code division multiple access (ACDMA), and the reservation-oriented channel may transmit data based on orthogonal code division multiple access (OCDMA).

The at least one criterion may include a threshold packet size, and the comparing step may involve comparing the threshold packet size to a packet size that characterizes packets in which data is to be communicated from the given terminal.

The at least one criterion may include is a threshold data rate, and the comparing step may involve comparing the threshold data rate to an average data rate calculated over a time interval, that characterizes packets in which data is to be communicated from the given terminal.

The at least one criterion may include a packet type indication, and the comparing step may involve comparing the packet type indication to packet types that characterize packets in which data is to be communicated from the given terminal.

As another example, based on FIG. 5A, in a code division multiple access (CDMA) communications system including plural terminals that communicate with a node via at least a random access channel and a reservation-oriented channel, a method of managing traffic on the random access and reservation-oriented channels is provided. The method involves examining a degree of loading of an output buffer of a given terminal to arrive at a Q-state, and comparing a threshold to the Q-state of the given terminal. If the Q-state is greater than the threshold, then the method involves assigning to the given terminal, a code designating a reservation-oriented sub-channel; and causing the given terminal to transmit data on the reservation-oriented sub-channel. But if the Q-state is less than the threshold, then the method involves causing the given terminal to transmit data on the random access channel.

The method may further involve communicating the Q-state over the random access channel.

The random access channel may be configured to permit the terminals to communicate data on the random access channel at times that are not previously scheduled, and the reservation-oriented channel may communicate data at a higher overall data rate than the random access channel.

The terminals may be customer premise equipments (CPEs), and the node may be a gateway linking plural CPEs to an internet via a satellite communications network.

The random access channel may transmit data based on asynchronous code division multiple access (ACDMA), and the reservation-oriented channel may transmit data based on orthogonal code division multiple access (OCDMA).

Based on FIG. 5B, the method may further involve, after causing the given terminal to transmit data on the reservation-oriented sub-channel: analyzing a history of at least one Q-state of the given terminal to arrive at a Q-state history analysis; and based at least in part on the Q-state history analysis, selecting and executing a step from a group including: (i) assigning to the given terminal, a first code designating a faster reservation-oriented sub-channel operating at a higher data rate than a present data rate; (ii) assigning to the given terminal, a second code designating a same-speed reservation-oriented sub-channel operating at a same data rate as the present data rate; (iii) assigning to the given terminal, a third code designating a slower reservation-oriented sub-channel operating at a lower data rate than the present data rate; or (iv) revoking from the given terminal, any code designating any reservation-oriented sub-channel.

The first, second, and third codes may be progressively longer Walsh codes designating respective reservation-oriented sub-channels operating at respective progressively lower data rates.

The method may further involve communicating the Q-state over a reservation-oriented sub-channel.

The random access channel may be configured to permit the terminals to communicate data on the random access channel at times that are not previously scheduled, and the reservation-oriented channel may communicate data at a higher overall data rate than the random access channel.

The terminals may be customer premise equipments (CPEs), and the node may be a gateway linking plural CPEs to an internet via a satellite communications network.

The random access channel may transmit data based on asynchronous code division multiple access (ACDMA), and the reservation-oriented channel may transmit data based on orthogonal code division multiple access (OCDMA).

As a further example, based on FIG. 6, in a code division multiple access (CDMA) communications system including plural terminals that communicate with a node via at least a random access channel and a reservation-oriented channel, a method of managing traffic on the random access and reservation-oriented channels is provided. The method involves examining a degree of loading of an output buffer of a given terminal to arrive at a Q-state, and determining, based at least in part on the Q-state, whether the given terminal is in a busy condition. If the given terminal is determined to be in the busy condition, the method involves assigning to the given terminal, a code designating a reservation-oriented sub-channel, and causing the given terminal to transmit data on the reservation-oriented sub-channel. But if the given terminal is determined not to be in the busy condition, causing the given terminal to transmit data on the random access channel.

The code may be a Walsh code designating the reservation-oriented sub-channel.

The random access channel may be configured to permit the terminals to communicate data on the random access channel at times that are not previously scheduled, and the reservation-oriented channel may communicate data at a higher overall data rate than the random access channel.

The terminals may be customer premise equipments (CPEs), and the node may be a gateway linking plural CPEs to an internet via a satellite communications network.

The random access channel may transmit data based on asynchronous code division multiple access (ACDMA), and the reservation-oriented channel may transmit data based on orthogonal code division multiple access (OCDMA).

Computer program products are provided for storing program instructions for execution on a computer system having at least one data processing device, whose instructions when executed by the computer system cause the computer system to perform the methods described above.

Computer systems are provided that are configured to perform the methods described above.

The foregoing embodiments are merely examples and are not to be construed as limiting the invention. The present teachings can be readily applied to other types of apparatus. The description of the embodiments is intended to be illustrative, and not to limit the scope of the claims. Many alternatives, modifications, and variations will be apparent to those skilled in the art.

Numerous modifications and variations of the present invention are possible in light of the above teachings. For example, the particular implementation of the traffic management function software, terminals, and nodes or gateways, may be varied without departing from the scope of the invention. Of course, the particular hardware or software implementation of the invention may be varied while still remaining within the scope of the present invention. It is therefore to be understood that within the scope of the appended claims and their equivalents, the invention may be practiced otherwise than as specifically described herein.

What is claimed is:

1. A communications system that communicates via at least a random access channel and a reservation-oriented channel, comprising:
  a node that compares at least one criterion to at least one characteristic of traffic in which data is communicated from a given terminal; and
  wherein upon the at least one traffic characteristic satisfying the at least one criterion, the node, in response to a bandwidth reservation request, processes and grants the bandwidth reservation request, communicates the granting of the bandwidth reservation request to the given terminal, and causes the given terminal to transmit data on the reservation-oriented channel, the reservation-oriented channel transmits data based on orthogonal code division multiple access (OCDMA); and
  wherein upon the at least one traffic characteristic not satisfying the at least one criterion, the node causes the given terminal to transmit data on the random access channel, the random access channel transmits data based on asynchronous code division multiple access (ACDMA).

2. The system of claim 1, wherein:
  the random access channel permits at least one of the given terminal or at least one other terminal to communicate data on the random access channel at times that are not previously scheduled; and
  the reservation-oriented channel communicates data at a higher overall data rate than the random access channel.

3. The system of claim 1, wherein:
  the given terminal is a customer premise equipment (CPE); and
  the node is a gateway linking plural CPEs to an interne via a satellite communications network.

4. The system of claim 1, wherein:
  the given terminal sends the bandwidth reservation request;
  the node processes and grants the bandwidth reservation request; and
  the granting of the bandwidth reservation request is communicated from the node to the given terminal.

5. The system of claim 1, wherein:
  the at least one criterion includes a threshold packet size; and
  the comparison includes comparing the threshold packet size to a packet size that characterizes packets in which data is to be communicated from the given terminal.

6. The system of claim 1, wherein:
  the at least one criterion includes a threshold data rate; and
  the comparison includes comparing the threshold data rate to an average data rate calculated over a time interval that characterizes packets in which data is to be communicated from the given terminal.

7. The system of claim 1, wherein
  the at least one criterion includes a packet type indication;
  the comparing step includes comparing the packet type indication to packet types that characterize packets in which data is to be communicated from the given terminal.

8. The system of claim 1, wherein the node determines a data rate for the reservation oriented channel based upon contextual information associated with the request.

9. The system of claim 1, wherein the node determines a maximum data rate for the reservation oriented channel such that transmission power of the given terminal at the maximum data rate does not exceed a maximum transmit power of the given terminal.

10. The system of claim 9, wherein the node determines a reservation time for the granted bandwidth reservation request, wherein:

$$ReservationTime = \frac{((QueueSize)_{CPE} - CurrentRate * (RTT + GuardTime))}{Rate_{WC}}$$

$QueueSize_{CPE}$ denotes a current transmit queue size at the given terminal, CurrentRate denotes a current rate at which the given terminal is transmitting packets to the node, RTT denotes a mean round trip on the reservation oriented channel between the node and the given terminal, GuardTime equals the largest difference in a forward link propagation delay that can be incurred by any two terminals in a beam, $Rate_{wc}$ is the maximum data rate.

11. A communications system that communicates via at least a random access channel and a reservation-oriented channel, the system comprising:
a node that compares at least one criterion to at least one characteristic of traffic in which data is communicated from a given terminal in order to arrive at an examination result;
wherein the node determines based on the examination result, whether the given terminal is in a busy condition; and
wherein upon determining the given terminal to be in a busy condition, the node assigns to the given terminal, a code designating a reservation-oriented sub-channel, and causes the given terminal to transmit data on the reservation-oriented sub-channel, the reservation-oriented channel transmits data based on orthogonal code division multiple access (OCDMA); and
wherein upon determining the given terminal to not be in a busy condition, the node causes the given terminal to transmit data on the random access channel.

12. The system of claim 11, wherein the code is a Walsh code.

13. The system of claim 11, wherein:
the random access channel permits the terminal to communicate data on the random access channel at times that are not previously scheduled; and
the reservation-oriented channel communicates data at a higher overall data rate than the random access channel.

14. The system of claim 11, wherein:
the terminal is a customer premise equipment (CPE); and
the node is a gateway linking plural CPEs to an interne via a satellite communications network.

15. The system of claim 11, wherein:
the at least one criterion includes a threshold packet size; and
the comparison includes comparing the threshold packet size to a packet size that characterizes packets in which data is to be communicated from the given terminal.

16. The system of claim 11, wherein:
the at least one criterion includes a threshold data rate; and
the comparison includes comparing the threshold data rate to an average data rate calculated over a time interval that characterizes packets in which data is to be communicated from the given terminal.

17. The system of claim 11, wherein
the at least one criterion includes a packet type indication;
the comparison includes comparing the packet type indication to packet types that characterize packets in which data is to be communicated from the given terminal.

18. The system of claim 11, wherein the node determines a data rate for the reservation oriented sub-channel based upon contextual information associated the request.

19. The system of claim 11, wherein the node determines a maximum data rate for the reservation oriented sub-channel such that transmission power of the given terminal at the maximum data rate does not exceed a maximum transmit power of the given terminal.

20. A communications system that communicates via at least a random access channel and a reservation-oriented channel, comprising:
means for managing traffic that compares at least one criterion to at least one characteristic of traffic in which data is communicated from a given terminal; and
wherein upon the at least one traffic characteristic satisfying the at least one criterion, the means for managing traffic, in response to a bandwidth reservation request, processes and grants the bandwidth reservation request, communicates the granting of the bandwidth reservation request to the given terminal, and causes the given terminal to transmit data on the reservation-oriented channel, the reservation-oriented channel transmits data based on orthogonal code division multiple access (OCDMA); and
wherein upon the at least one traffic characteristic not satisfying the at least one criterion, the means for managing traffic causes the given terminal to transmit data on the random access channel, the random access channel transmits data based on asynchronous code division multiple access (ACDMA).

* * * * *